July 13, 1948.    G. C. FIELDS    2,445,058
MOTOR VEHICLE CONTROL MECHANISM FOR SEQUENTIALLY
CONTROLLING WHEEL BRAKING AND MOTOR SPEED
Filed Dec. 13, 1943    2 Sheets-Sheet 1
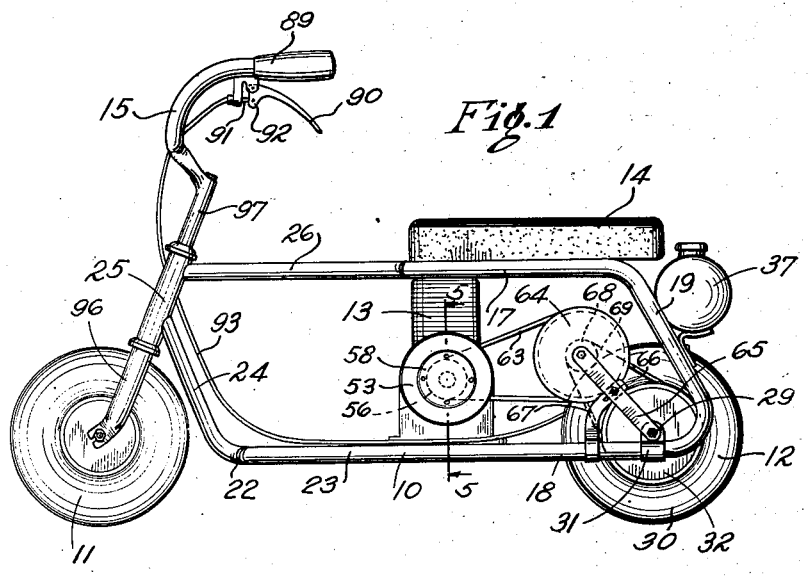
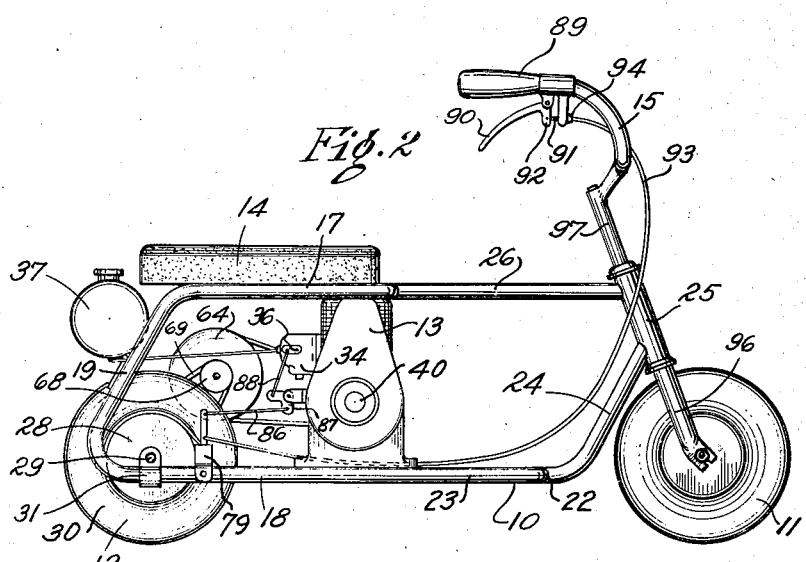
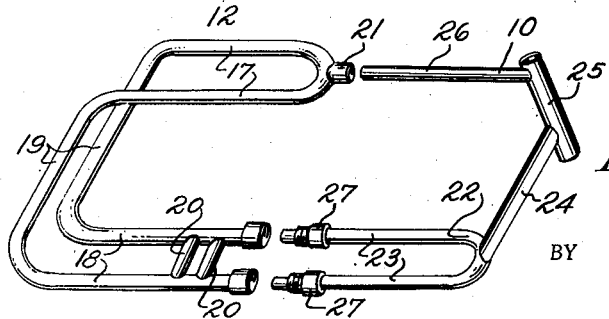
INVENTOR.
GEORGE C. FIELDS
BY Richey Watts
ATTORNEYS July 13, 1948.   G. C. FIELDS   2,445,058
MOTOR VEHICLE CONTROL MECHANISM FOR SEQUENTIALLY
CONTROLLING WHEEL BRAKING AND MOTOR SPEED
Filed Dec. 13, 1943   2 Sheets-Sheet 2
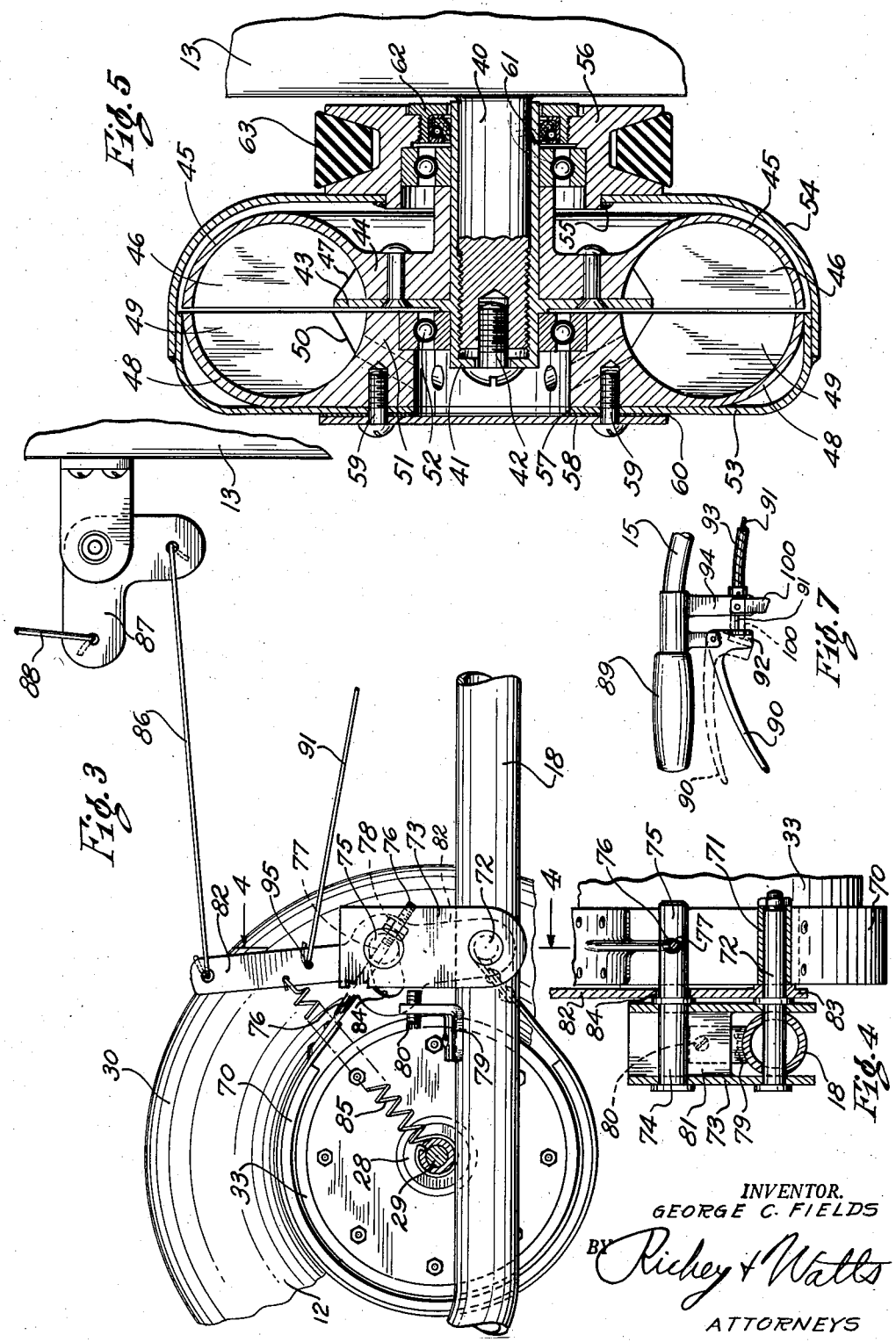
INVENTOR.
GEORGE C. FIELDS
BY Richey & Watts
ATTORNEYS Patented July 13, 1948

2,445,058

UNITED STATES PATENT OFFICE 2,445,058

MOTOR VEHICLE CONTROL MECHANISM FOR SEQUENTIALLY CONTROLLING WHEEL BRAKING AND MOTOR SPEED

George C. Fields, Cleveland, Ohio, assignor to Solar Corporation, Milwaukee, Wis., a corporation of Delaware Application December 13, 1943, Serial No. 514,043

4 Claims. (Cl. 180—77)

This invention relates to motor vehicles and particularly to a driving and control arrangement for a two or three wheeled vehicle of the type commonly known as a "scooter."

The principal object of this invention is to provide mechanism whereby a motor vehicle may be accelerated, decelerated, driven at any desired speed, and stopped with a minimum of effort, skill, and attention by the operator. Other objects are to reduce the weight and bulk of a vehicle of the "scooter" type to such an extent that it may be conveniently carried by a person; to eliminate all roughness in the transmission of torque from the engine to the vehicle, particularly when starting and at low speeds; and to control the driving and braking of the vehicle by a single control member movable in one direction to accelerate and in another to decelerate the vehicle.

Other objects and advantages relating to details of construction and economies of manufacture will appear in the following description of a preferred embodiment of the invention.

In the accompanying drawings:

Fig. 1 is a side elevation of a vehicle embodying this invention;

Fig. 2 is a view similar to Fig. 1 but of the opposite side;

Fig. 3 is a side elevation on an enlarged scale of a portion of the brake and control mechanism shown in Fig. 2, with parts broken away;

Fig. 4 is a section taken on the line 4—4 of Fig. 3;

Fig. 5 is a cross section taken on the line 5—5 of Fig. 1 on an enlarged scale;

Fig. 6 is a perspective view of the frame disassembled; and

Fig. 7 is a detail elevational view of the control handle and latch.

Referring to the drawings, the vehicle illustrated consists generally of a frame 10, two road wheels 11 and 12, a gasoline engine 13 arranged to drive the wheel 12, a seat 14 and handle bars 15 arranged to steer the wheel 11.

The frame preferably includes a rear portion made of a piece of tubing bent into a hair pin shape and in turn bent in U-shape so as to provide a bifurcated seat supporting portion 17, spaced motor and wheel supporting side members 18, and spaced upwardly extending supports 19. The side members 18 are connected together in any suitable manner, as by cross pieces 20 welded thereto. A short tube or socket 21 is welded to the bight of the seat supporting portion 17. The forward portion of the frame preferably includes a tube bent into U-shape to provide a bight 22 and side members 23 aligned with the members 18, a forwardly and upwardly extending support 24 welded to the bight 22, a bearing sleeve 25 welded to the support 24, and a rearwardly extending tube 26 welded to the sleeve 25 and aligned with the socket 21. The ends of the side members 23 are arranged to fit into the ends of the side members 18 and to be secured in place in any convenient manner, as by wedging sleeves 27 to screw into the ends of the tubes 18 (see Fig. 6). The tube 26 may simply slip over or into the tube 21 with a friction fit.

The foregoing arrangement may be used where it is desired to make the vehicle collapsible. If collapsibility is not desired the frame may be assembled in the same way and the ends of the side members 23 welded into the ends of the side members 18, and the end of the tube 26 welded to the tume 21, as shown in Figs. 1 and 2.

The rear wheel 12 preferably consists of a hub 28 journalled upon a supporting axle 29 and carrying a tire 30. The wheel is positioned between the side members 18 of the frame and secured in place by any suitable means such as clips 31 encircling the side members 18 and apertured to receive the ends of the axle 29.

One side of the hub 28 has a driving sprocket 32 secured thereto and the other side has a brake drum 33 secured thereto. The side members 18 are spaced apart sufficiently to receive the wheel, the sprocket 32, and the brake drum 33.

The gasoline engine 13 which is mounted on the frame, is provided with the usual carburetor 34 (Fig. 2) and a throttle valve controlled by the arm 36. A fuel tank 37 may be carried in any convenient portion upon the vehicle, preferably upon the spaced supports 19, as shown in Figs. 1 and 2.

The crankshaft 40 of the gasoline motor 13 is arranged parallel with the axle 29 of the wheel 12 and projects from the motor on the side of the vehicle on which the sprocket 32 of the wheel 12 is located, which is the left side of the vehicle as illustrated in Figs. 1 and 2. A fluid coupling is secured to the shaft 40 to transmit the power of the motor to the axle. In the embodiment shown in Fig. 5 a tube 41 is screwed over the end of the shaft 40 and is locked in position by a screw 42 extending through a hole in the end of the sleeve 41 and threaded into the end of the shaft 40. A flange 43 extends radially from the sleeve 41 and is riveted to a hub 44 which fits snugly about the sleeve 41. The hub 44 carries one-half of the fluid coupling, consisting of an annular shell 45 divided into spaced pockets by radial partitions 46. The partitions 46 are cut away at their inner ends as indicated at 47 and the flange 43 projects radially outward to close the cut away portions and interrupt the drive at low speeds.

The other half of the fluid coupling includes an annular shell 48 similar to and facing the shell 45 which is also divided into pockets by radial partitions 49 cut away at their inner ends as indicated at 50. The shell 48 has a hub 51 supported from the sleeve 41 by an anti-friction bearing 52 of any suitable type. A sheet metal casing is arranged to surround the fluid coupling and includes an outer half 53, preferably welded to the hub 51, and an inner half 54 welded to the outer half 53 and spaced from the shell 45. The inner half 54 of the casing extends radially inward around the shell 45 and is welded as at 55 to the adjacent side of a driving pulley 56. The outer half 53 of the casing is preferably formed with a central opening 57 which is normally closed by a cover plate 58 secured in place by screws 59. A gasket 60 is preferably arranged between the cover plate 58 and the outer half 53 of the casing.

The driving pulley 56 is supported from the sleeve 41 by a suitable anti-friction bearing 61. An oil seal 62 of any suitable type is preferably mounted in the inner side of the pulley 56 to prevent leakage of fluid between the pulley 56 and the sleeve 41.

With this arrangement the fluid drive includes a driving portion consisting of the hub 44 and the annular shell 45 rigidly secured to the motor shaft 40 while the remainder or driven part of the structure, including the annular shell 48, the casing 53—54 and the driving pulley 56, is supported from the motor shaft 40 through the bearings 52 and 61.

The pulley 56 is preferably constructed to receive a V belt 63 which extends around an idler pulley 64. The idler pulley 64 is supported by an arm 65 pivoted to the end of the axle 29 of the wheel 12 and adjustably held in position by a bolt 66 extending into a slot in the end of an arm 67 rigidly secured to one of the frame side members 18. A driving sprocket 68 is secured to the idler pulley 64, and a chain 69 passes around the sprocket 68 and the sprocket 32 carried by the wheel 12. With this arrangement the idler 64 can be adjusted toward or away from the driving pulley 56 by moving the bolt 66 along the slot in the arm 67 without disturbing the predetermined relationship between the sprocket 68 and the sprocket 32. Preferably, as illustrated, the driving pulley 56 is smaller than the idler 64, and the sprocket 68 is smaller than the sprocket 32, to provide a double speed reduction from the fluid coupling to the driving wheel.

Any suitable braking mechanism for the vehicle may be provided. As illustrated somewhat diagrammatically, a resilient brake band 70 is arranged around the brake drum 33 and has one end anchored, as shown at 71, to a pin 72 which extends through one of the side frame members 18. Also pivoted on the pin 72 is a yoke 73, the legs of which straddle the frame member 18. A pin 74 is secured to the yoke 73 and has one end 75 projecting laterally therefrom into alignment with the brake band 70. A rod 76 is secured to the opposite end of the brake band 70 and extends through a hole 77 in the pin 75. The end of the rod 76 is threaded and nuts 78 secure the rod 76 to the pin 75 in the desired adjusted position. A bracket 79 is welded to the frame side member 18 and carries an adjustable set screw 80 positioned to engage the end wall 81 of the yoke 73 so as to limit the pivotal movement of the yoke in the direction to release the brake band 70.

A lever 82 is pivoted at 83 to the pin 72 between the yoke 73 and the brake band 70. The lever 82 is formed intermediate its ends with an arcuate slot 84 through which the pin 75 passes. A spring 85 has one end secured to the wheel axle 29 and has its other end connected to the lever 82. The spring 85 is arranged to pull the lever 82 to the left, as shown in Fig. 3, so that in normal condition the pin 75 is located in the right hand side of the slot 84 and the spring 85 holds the yoke 73 in contact with the set screw 80.

The front wheel 11 is carried by a fork 96 on the end of a steering post 97 journalled in the sleeve 25. The handle bars 15, provided with hand grips 89, are carried on the upper end of the post 97 so that the front wheel 11 may be steered in the customary manner.

A control lever 90 is pivoted to one of the grips 89 of the handle bars 15 in position to be readily grasped by the operator's hand to be squeezed toward or released from the grip 89. A cable 91 is connected to a lever arm 92 projecting from the control lever 90 and extends through a flexible conduit 93. One end of the conduit 93 is fixed to a depending lug 94 secured to the grip 89, and the other end is fixed to the vehicle frame, so that when the control lever 90 is pressed toward the grip 89 the cable 91 is pulled through the conduit 93. The opposite end of the cable 91 is connected at 95 to the lever 82.

A link 86 connects the upper end of the lever 82 with one arm of a bell crank lever 87, the other arm of which is connected by a link 88 with the throttle valve arm 36.

With this arrangement the spring 85 normally holds the lever 82 in the position illustrated in Fig. 3 in which position the cable 91 holds the control handle 90 spaced from the grip 89, as shown in Figs. 1 and 2. Also in this position of the parts the link 86, bell crank lever 87 and link 88 hold the throttle valve 35 in wide open position. When the control handle 90 is pressed toward the grip 89 the cable 91 pulls the lever 82 to the right, as seen in Fig. 3. The lever 82 pivots to the right without moving the yoke 73 until the left hand end of the slot 84 comes into contact with the pin 75. During such movement the throttle valve 35 of the engine is moved from its wide open position toward idling position. Further movement of the lever 82 to the right, as seen in Fig. 3, causes the yoke 73 to rock to the right by reason of the engagement of the pin 75 in the left hand end of the slot 84. Movement of the yoke 73 to the right pulls upon the rod 76 and tightens the brake band 70 about the brake drum 33 to stop the wheel 30 as the throttle is brought to full idling position. The reverse movements take place under the influence of the spring 85 when the control handle 90 is released partially or entirely from the grip 89.

A link 100 is pivoted to the depending lug 94 which carries the flexible conduit 93, and is arranged to be swung upwardly, as shown in dotted lines in Fig. 7, to latch the handle 90 in its compressed position adjacent the grip 89 when desired. By this means the throttle may be closed to idling position and the brake band 70 tightened about the drum 33, and the handle 90 may then be latched in position, so that the operator's hand may be removed from the handle 90 without releasing the brake or accelerating the engine.

In operation assume that the engine 13 is started with the handle 90 held in position adjacent the grip 89 so that the brake is applied and the throttle valve 35 is closed to idling position. The engine crankshaft 40 is then rotated at a relatively low speed, carrying with it the annular shell 45 which forms one side of the fluid coupling. The fluid trapped in the pockets formed by the partitions 46 tends to be driven by centrifugal force in a spiral path into the pockets formed by the partitions 49 in the annular shell 48. However, the spiral flow is interrupted by the flange 43 and the fluid is permitted to circulate within each shell 45 and 48 through the spaces formed by the cutting away of the partitions at 47 and 50. Thus little or no driving force is transmitted from the shell 45 to the shell 48. To start the vehicle the control handle 90 is permitted to move away from the grip 89 under the influence of the spring 85. The first portion of this movement releases the brake band 70 and starts to open the throttle 35. Further movement of the control handle 90 away from the grip 89 further opens the throttle 35 and accelerates the engine 13. As the crankshaft 40 of the engine speeds up, the annular shells 45 and 48 operate in the customary manner of a fluid coupling to transmit torque from the shell 45 to the shell 48 so as to rotate the driving pulley 56. This rotation is transmitted through the V belt 63 to the idler pulley 64, and from the sprocket 68 through the chain 69 to the sprocket 32, thereby rotating the driving wheel 12. To increase the speed of the vehicle the operator's grip on the control handle 90 is further released, and to decrease the speed this handle is simply gripped more tightly toward the handle grip 89.

With this arrangement the entire control of the vehicle is effected by the movement of the control handle 90. Closing the handle 90 to idling speed of the engine interrupts the transmission of power to the wheel and further squeezing of the handle 90 applies the brake. The releasing of the brake, the application of the engine torque to the wheel, and any desired acceleration of the vehicle are effected by simply releasing the control handle 90 and permitting it to move in the opposite direction.

The direction of movement of the control handle 90 with respect to the lever 82, and the direction of the force of the spring 85 may be reversed, so that the spring force decelerates the engine and applies the brake when the handle is released. The described arrangement, however, is preferred because the natural tendency of the driver when confronted by any emergency is to grip the handle bars more tightly, which decelerates the engine and applies the brake, and also because with the described arrangement a relatively light spring 85 may be employed having just sufficient force to overcome the friction of the links and open the throttle, while a much greater force may be applied to the brake when necessary by gripping the handle 90 more tightly.

The transmission of the engine power through the fluid coupling eliminates all roughness in the transmission of torque to the vehicle so that the vehicle may be operated at a relatively low speed without the jerkiness characteristic of vehicles of this type heretofore made. At the same time the fluid coupling permits a substantial reduction in the weight of the engine, since it is unnecessary to use a heavy fly wheel to attempt to smooth out the rotation of the engine shaft.

Further reduction in the weight of the vehicle results from the double speed reduction from the outlet side of the fluid coupling to the driving wheel. This permits the use of a high speed motor so that a given power output may be obtained with less weight since the power output of an internal combustion engine of a given size inherently increases with an increase in the speed of operation. At the same time the location of the fluid coupling on the high speed shaft makes possible the use of a coupling of minimum size and weight since the higher the speed at which the coupling is operated the smaller its diameter may be for a given efficiency.

As a result of the reduction in size and weight of the engine made possible by this invention and the elimination of all clutches and gear boxes in the transmission the present invention makes it possible to construct a scooter type of vehicle of high performance characteristics but sufficiently light in weight to be conveniently carried about by the operator, to be transported in airplanes and to be dropped by parachute.

Although a preferred embodiment of the invention has been described in considerable detail it will be understood that many modifications and variations in detail may be resorted to without departing from the scope or spirit of the invention as defined in the following claims.

I claim:

1. In a motor vehicle having a frame, a traction wheel mounted therein, a brake for the wheel, and a motor for driving the wheel; the combination including a yoke pivoted to the frame adjacent the wheel and connected to the brake for applying the latter when moved in one direction, a lever fulcrumed to the frame, adjacent the yoke, and having a lost motion connection therewith whereby it will actuate the yoke to apply the brake when reaching one limit of the lost motion, means for operating the lever, and a control connection operated by the lever to govern the speed of the motor within the lost motion limits of said lever with respect to the yoke.

2. In a motor vehicle having a frame, a traction wheel mounted therein, a brake for the wheel, and a motor for driving the wheel; the combination including a yoke pivoted to the frame adjacent the wheel and connected to the brake for applying the latter, a motor speed controlling lever fulcrumed to the frame coaxially with the yoke pivot, a lost motion connection between said lever and yoke, and means for operating the lever to first decelerate the engine and then apply the brake, said last mentioned means including a manually operated element for moving the lever in one direction and a spring for moving the lever in the other direction.

3. In a motor vehicle having a frame, a traction wheel mounted therein, a brake for the wheel, and a motor for driving the wheel; a member pivoted to the frame and connected with the brake to apply the latter, an adjustable stop limiting movement of the pivoted member in one direction, a second member movable on the frame adjacent the pivoted member and having a lost motion connection therewith, means operated by said second member for controlling the speed of the motor, and means for manually operating said second member to decelerate the motor before applying the brake.

4. In a motor vehicle having a frame, a traction wheel mounted therein, a brake for the wheel, and a motor for driving the wheel; a member pivoted to the frame and connected with the brake to operate the latter, a lever fulcrumed on the frame to oscillate about a center coaxial with the pivot of said member, a lost motion connection between the lever and said member permitting limited movement of the lever without moving said member, manually operated means for moving the lever in one direction, a spring tending to move the lever in the opposite direction, and means connected with the lever for controlling the speed of the motor whereby the motor will be decelerated before the lever engages the pivoted member to apply the brake.

GEORGE C. FIELDS.

REFERENCES CITED

The following references are of record in the file of this patent:

UNITED STATES PATENTS

| Number | Name | Date |
|---|---|---|
| 1,302,656 | Haussman | May 6, 1919 |
| 1,486,932 | Stewart | Mar. 18, 1924 |
| 1,632,940 | Wright | June 21, 1927 |
| 1,767,388 | Moorhouse | June 24, 1930 |
| 1,817,416 | Lippert | Apr. 4, 1931 |
| 2,037,321 | French | Apr. 14, 1936 |
| 2,111,691 | Salsbury | Mar. 22, 1938 |
| 2,225,914 | Lewis et al. | Dec. 24, 1940 |
| 2,260,798 | Burns | Oct. 28, 1941 |
| 2,280,157 | Mead | Apr. 21, 1942 |
| 2,281,118 | Smirl | Apr. 28, 1942 |
| 2,294,994 | Maze | Sept. 8, 1942 |
| 2,331,976 | Hare | Oct. 19, 1943 |

FOREIGN PATENTS

| Number | Country | Date |
|---|---|---|
| 27,744 | Great Britain | Dec. 19, 1904 |
| 147,490 | Great Britain | July 8, 1920 |
| 413,799 | Great Britain | July 26, 1934 |